United States Patent
Palmer et al.

(10) Patent No.: US 7,097,131 B2
(45) Date of Patent: Aug. 29, 2006

(54) DRAIN VALVE AND METHOD OF MOUNTING

(75) Inventors: Daniel A. Palmer, Middletown, OH (US); Daniel Lee McGuire, Miamisburg, OH (US); John P. Ludy, Farmersville, OH (US)

(73) Assignee: Auto-Valve Inc., Dayton, OH (US)

( * ) Notice: Subject to any disclaimer, the term of this patent is extended or adjusted under 35 U.S.C. 154(b) by 10 days.

(21) Appl. No.: 10/921,513

(22) Filed: Aug. 19, 2004

(65) Prior Publication Data
US 2005/0045769 A1 Mar. 3, 2005

Related U.S. Application Data

(60) Provisional application No. 60/498,010, filed on Aug. 26, 2003.

(51) Int. Cl.
*B64D 45/02* (2006.01)

(52) U.S. Cl. ............... 244/1 A; 244/129.1; 244/135 R; 361/218

(58) Field of Classification Search ............. 244/131, 244/133, 1 A, 117 R, 119, 129.1, 135 R; 251/144; 361/218; 524/376; 137/322
See application file for complete search history.

(56) References Cited

U.S. PATENT DOCUMENTS

| 2,510,727 | A | * | 6/1950 | Sussenbach ............... 524/376 |
| 3,026,897 | A | * | 3/1962 | Derrington et al. ......... 251/144 |
| 3,698,420 | A | * | 10/1972 | Grundy et al. .............. 251/144 |
| 3,703,189 | A | | 11/1972 | Koller |
| 4,351,355 | A | | 9/1982 | Koller et al. |
| 4,437,487 | A | * | 3/1984 | Marmon ..................... 137/322 |
| 4,556,591 | A | * | 12/1985 | Bannink, Jr. ................ 244/1 A |
| 4,630,168 | A | * | 12/1986 | Hunt .......................... 361/218 |
| 4,880,029 | A | * | 11/1989 | Koller ........................ 251/144 |
| 4,897,143 | A | * | 1/1990 | Covey ........................ 244/1 A |

* cited by examiner

*Primary Examiner*—Galen Barefoot
(74) *Attorney, Agent, or Firm*—Fay, Sharpe, Fagan, Minnich & McKee, LLP

(57) ABSTRACT

The invention includes a method of mounting a component to the skin of an aircraft. The component can include a drain valve, a gas cap, other external fuel instrumentation such as sensors, and antennae. One aspect of the invention includes a new method of mounting a drain valve to an aircraft fuel tank. The drain valve in the method includes any conventional drain valve having a stem and a flange that surrounds the stem. The method includes applying a material around a drain opening of the fuel tank; the material directs an electric charge away from the drain valve.

20 Claims, 4 Drawing Sheets

DRAIN VALVE AND METHOD OF MOUNTING

This application claims priority of Provisional Patent Application Ser. No. 60/498,010, filed Aug. 26, 2003, entitled "Drain Valve and Method of Mounting" which is incorporated herein by reference.

The invention relates to drain valves and, more particularly, to drain valves used in aircraft fuel tanks. The aircraft are not simply limited to airplanes, but also include helicopters and other aircraft. It is understood that the invention is also amenable to other applications, including gas caps, and other external fuel instrumentation as well as other lightning safe components including antennae and the like.

BACKGROUND OF THE INVENTION

Drain valves are often provided on aircraft fuel tanks so that liquid within the tank, such as water formed from condensated moisture, may be readily removed or drained. Such drain valves typically include a drain port or opening through which the liquid in the tank is drained and a valve member or poppet that moves in relation to the port to open and close the port. In operation, a preferred form of drain valve has a poppet which is biased to close the port and can be simply pushed inwardly of the fuel tank by use of a screwdriver or other simple tool to open the port. Upon release, the poppet automatically returns to its part-closing position under spring tension. Examples of such drain valves are shown in commonly owned Koller, U.S. Pat. No. 3,703,189 and Koller, U.S. Pat. No. 4,351,355. Another and improved construction is disclosed in, commonly owned Koller, U.S. Pat. No. 4,880,029, the disclosure of which is hereby incorporated by reference herein. These valves have proved reliable and have been commercially successful for a number of years.

A known method of mounting a drain valve to the frame of an aircraft includes the following steps in the order recited. First, the frame or skin of the aircraft is primed with a conventional paint primer. Second, the valve is installed. Third, the valve is masked with a conventional tape, or the like. Finally, the frame of the aircraft is painted.

Part of the design of drain valves used in aircraft is to withstand a wide variety of environmental conditions while maintaining the desired, normally closed position of the poppet. For example, valve components formed of dielectric or non-conductive materials are widely used to improve the capabilities of withstanding and/or avoiding lightning strikes. Likewise, the known devices employ special locking devices and complex constructions to address lightning strike issues. Drain valves are subject to involuntary opening as a result of a lightning strike. During a lightning strike the electric charge from the lightning seeks the least resistant path in order to dissipate the charge. It is believed that the electric charge or arc finds the metal that surrounds the drain valve opening in the aircraft even though careful attention is provided to ensure that the surface is primed and painted, and that no bare metal is exposed. It is also believed that the electric charge or arc results in a very large force concentrated in a relatively small area, i.e., the cracks in the paint. This arc results in a concussion, of sorts, that can crack or even destroy the flange that surrounds the stem of the drain valve. Furthermore, the arc can bypass the valve completely en route to the drain opening.

Accordingly, it is desirable to provide a drain valve and method of mounting the drain valve that encourages diffusion of electric arc into the frame or skin of the aircraft away from the drain opening, and prevents the potential for the energy from a lightning strike from reaching the drain valve opening, thus avoiding the resultant concussion.

SUMMARY OF THE INVENTION

The invention includes a method of mounting a component to the skin of an aircraft. The component can include a drain valve, a gas cap, other external fuel instrumentation such as sensors, and antennae. One aspect of the invention includes a new method of mounting a drain valve in a drain opening for an aircraft fuel tank. The drain valve in the method includes any conventional drain valve having a stem and a flange that surrounds the stem. The method includes applying a material around a drain opening of the fuel tank where the material directs electric charge from a lightning strike away from the drain valve.

The method can further include applying a conductive material, such as conductive paint or ALODINE® material, to an exposed area around a drain opening. The drain valve is then mounted into the drain opening, with a flange of the drain valve overlapping the conductive material. The area covered by the conductive material can extend beyond the area covered by the flange.

In another embodiment, the method includes applying a dielectric material, such as a tank sealant, to the area that surrounds the drain opening. The area is primed and/or painted up to the drain opening. The drain valve is then mounted into the drain opening, with a flange of the drain valve overlapping the dielectric material.

According to another embodiment of the invention, a conductive ring is provided to at least substantially surround a flange of a drain valve. The ring attaches to the skin of an aircraft. The drain valve is inserted into a drain opening of a fuel tank of the aircraft and the ring is attached to the aircraft at least substantially surrounding the flange of the drain valve.

DETAILED DESCRIPTION OF THE INVENTION

Figure 1:
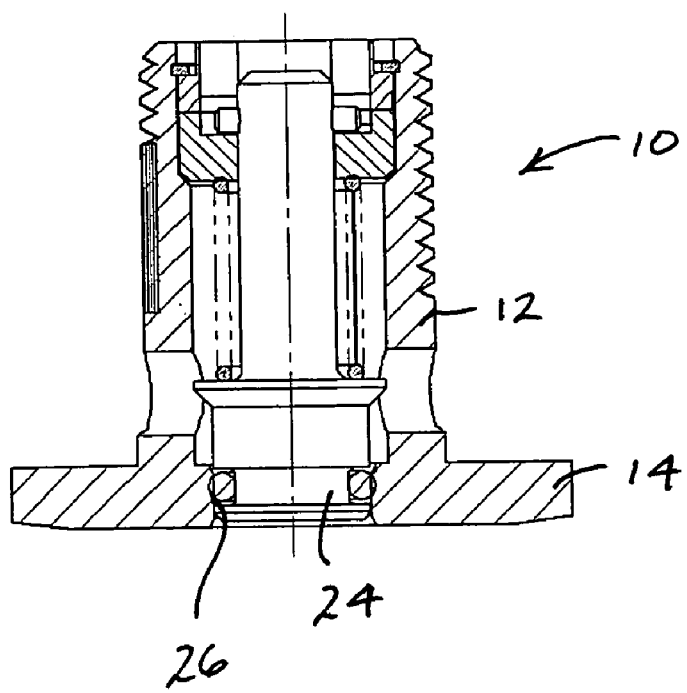
FIG. 1 is a sectional view of a drain valve used in the present invention.
Figure 2:
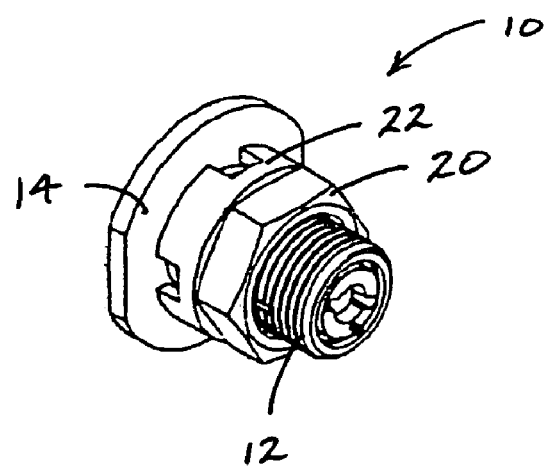
FIG. 2 is a rear perspective view of the drain valve of FIG. 1 having a mounting nut and spacer mounted thereto.
Figure 3:
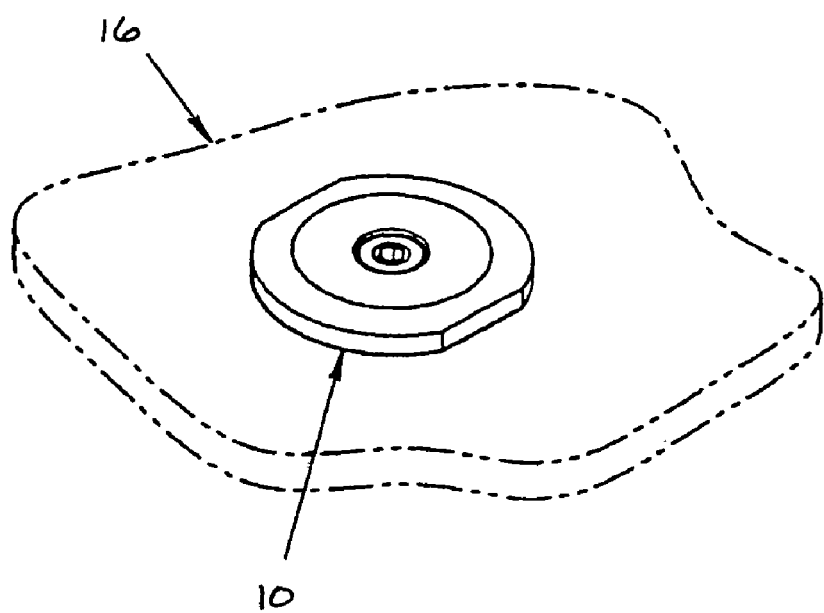
FIG. 3 is a perspective view of the drain valve of FIG. 1 mounted to an aircraft.
Figure 4:
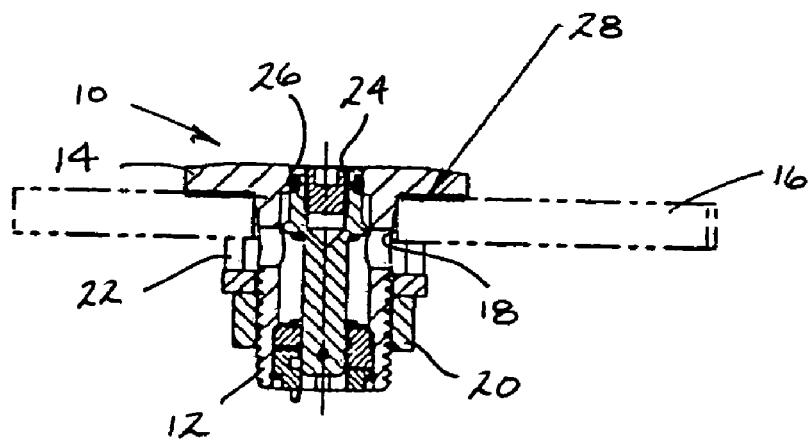
FIG. 4 is a sectional view of the drain valve of FIG. 3.

Referring to FIGS. 1 and 2, a drain valve 10 generally includes a tubular housing or stem 12 and an integral lower portion or flange 14. Referring to FIGS. 3 and 4, a wall 16 of a fuel tank defines a fuel tank drain opening 18, and a portion of the drain valve is received in the drain opening. The drain valve 10 can mount to the wail 16 using a mounting nut 20 and spacer 22, where the spacer and the nut receive the stem and the aircraft skin 16 is trapped in between the spacer and the flange as seen in FIG. 4. The drain valve includes a poppet 24 that moves in relation to a drain port 26 to stop the flow of liquid through the drain port.

A similar drain valve is described in more particularity in U.S. Pat. No. 4,880,029, which is incorporated by reference and assigned to the present assignee. Nevertheless, it is understood that the present method of mounting a drain valve can be used with any conventional drain valve having a stem and a flange. Since the method of mounting a drain valve according to the present invention is not specific to the drain valve described in the '029 patent, but to all conventional drain valves, more specific description of the drain valve is not necessary to allow one skilled in the art to practice the invention. It has been found desirable, however, to limit the amount of metal components found in the drain valve. The drain valve need not mount to the aircraft as shown, but the drain valve can mount to the aircraft in any conventional manner and the invention still be used with these alternative mounting manners.

The fuel tank of the aircraft can include any of the numerous fuel tanks located in the aircraft. For example, fuel tanks are often located in the wings and in an under portion of the fuselage of an aircraft. The wall 16 of the fuel tank can often comprise the skin of the aircraft. When manufacturing the aircraft, the skin 16 is typically primed and painted. The skin 16 of the aircraft is typically made from metal, usually an aluminum or aluminum alloy. The skin 16 can also be made from a composite panel having a metal, i.e., copper, wire mesh to dissipate the electric charge from a lightning strike.

FIGS. 3 and 4 disclose a method of mounting a drain valve 10. As stated above, typically the skin 16 of the aircraft is primed and painted. Next, a means for directing an electric charge away from the drain valve 10 is applied to the skin 16; such a means is referred to at numeral 28. Alternatively, the means for directing the electric charge is applied to an underside surface of the flange 14, i.e., that surface disposed in facing, mating relation with the skin 16 of the aircraft. Next, the drain valve is mounted to the skin, such that the flange overlaps the means 28. The means for directing electric energy away from the drain valve 10 and/or drain opening 18 inhibits the electric charge from passing underneath the flange 14 and dissipates the electric charge from a lightning strike such that the charge is not focused under any one point of the flange. Such a means can also be described as a means for encouraging electric charge to flow away from the drain valve and into the aircraft skin.

In a particular preferred embodiment, the means for directing an electric charge comprises a dielectric material 28. In this embodiment, paint and primer need not be removed from around the drain opening 18. Such a mounting arrangement obviates the need for masking the area around the drain opening prior to priming and painting the aircraft. In this method, sealant, such as tank sealant MIL-PRF-8802F, available from National Sealants & Lubricants, Inc. of Houston, Tex. is applied around the drain opening. Such a sealant is a two component synthetic rubber compound of the polysulfide type. Other sealants include SAE AMS-S-8802, SAE AMS-S-3267, and SAE AMS-S-3284. Of course, other suitable dielectric sealants can also be used without departing from the scope and intent of the present invention.

The drain valve is mounted to the fuel tank, with the flange of the valve overlapping the tank sealant. Preferably, the sealant 28 is interposed over substantially the entire interface between the valve flange and the skin, i.e. the sealant is circumferentially continuous about the drain opening 18 and extends radially from the opening to a dimension preferably at least as great as the radial dimension of the flange along the surface of the skin or underside of the flange. It is believed that the dielectric material prohibits the electric arc resulting from a lightning strike from reaching any exposed bare metal around the drain opening. Accordingly, the dielectric material forms a barrier along the path of the skin such that the electric arc dissipates by following an alternative path of least electrical resistance away from the fuel tank opening throughout the aircraft skin, and thus away from the inflammable fuel stored in the fuel tank.

Figure 5:
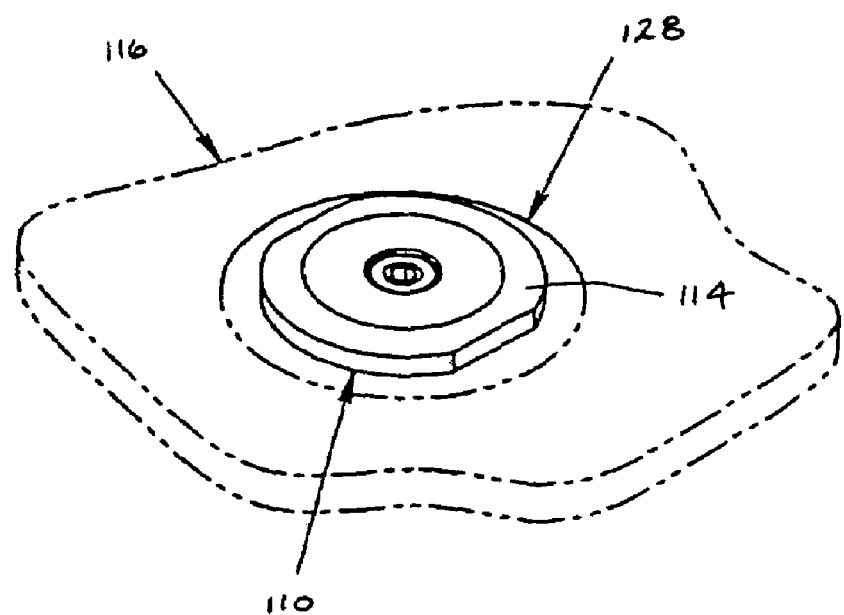
FIG. 5 is a perspective view of an alternative drain valve mounted to an aircraft.
Figure 6:
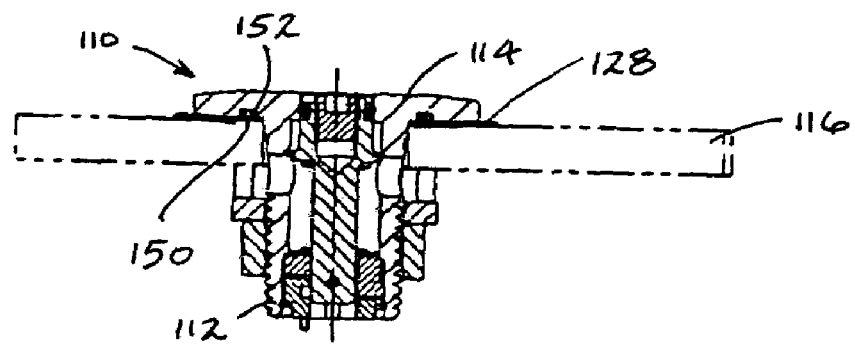
FIG. 6 is a sectional view of the drain valve of FIG. 5.

Referring to FIGS. 5 and 6, in another preferred embodiment, a drain valve 110 mounts to a fuel tank wall or skin 116 of an aircraft. The drain valve includes a stem 112 and a flange 114, like the drain valve 10 described above. In this embodiment, the flange 114 can include an annular notch 150 that receives an O-ring 152. Such a drain valve is described in more particularity in U.S. Pat. No. 4,880,029. In this embodiment, the means for directing electric energy away from the drain valve comprises a conductive material, such as a conductive paint or ALODINE® (chromate conversion) material. A conductive material as the means for directing electric charge is particularly useful when mounting the drain valve 110 to a composite aircraft skin 116. The conductive material enlarges the target area for lightning to strike around the drain valve 110 by increasing the conductive area around the flange 114 so that the flange is not the only conductive component on the composite skin. The conductive material also encourages the electricity to move toward the copper wiring embedded in the panel directing electricity away from the flange 110.

In this preferred embodiment, paint and primer are removed from a predetermined area around the drain opening 118. The predetermined area is a region that extends outwardly from the opening a dimension greater than that of the flange 114 of the drain valve. That is, once the drain is mounted to the wall/skin, a purposeful conductive region in the skin surrounds the entire perimeter of the drain valve—particularly the flange. ALODINE® material is a preferred conductive material applied to the exposed bare aluminum that surrounds the drain opening. The drain valve is then mounted to the fuel tank, with the flange of the valve overlapping a portion of the ALODINE® material in the predetermined area. It is believed that the electric arc resulting from a lightning strike would have greater electrical affinity (i.e., seek the path of least electrical resistance) through the ALODINE® material than if the paint and primer were left around the drain opening. Accordingly, the electric arc is dissipated throughout the aircraft skin, thus inhibiting the electric arc from passing underneath the flange and the skin of the aircraft and potentially impacting the structural integrity of the flange and/or remainder of the drain valve. The conductive material serves as a means for inhibiting the electrical energy from a lightning strike from passing beneath the drain valve flange since the electrical energy would seek the path of least electrical resistance and dissipate through a predetermined area of conductive material surrounding the perimeter of the flange.

Figure 7:
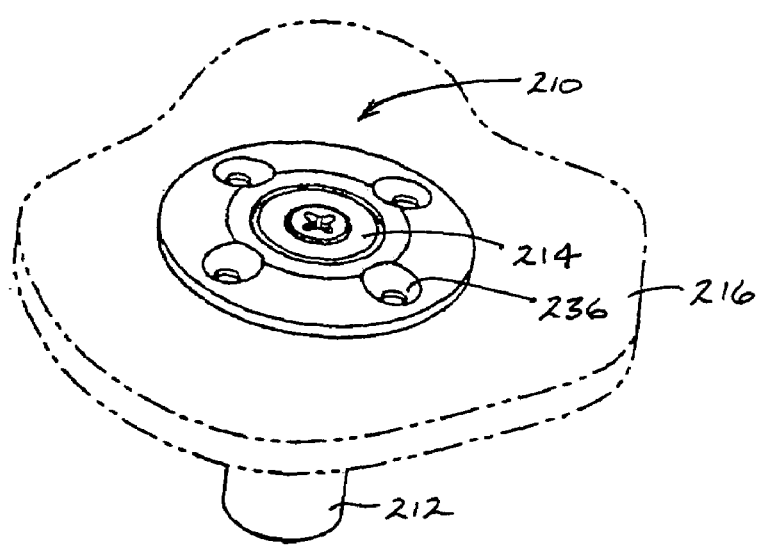
FIG. 7 is a perspective view of an alternative drain valve mounted to an aircraft.
Figure 8:
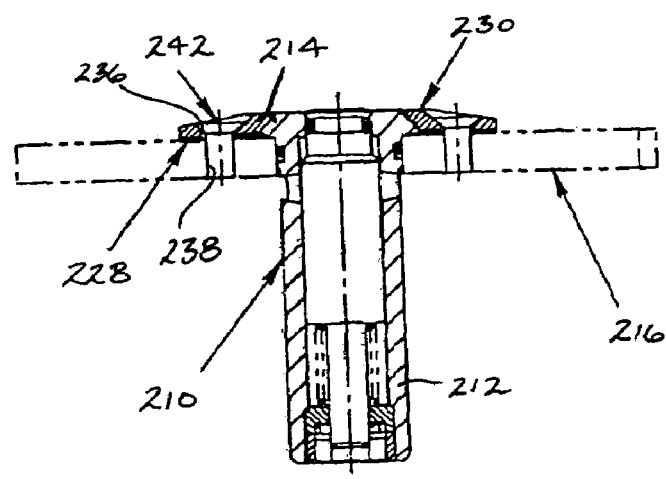
FIG. 8 is a sectional view of the drain valve of FIG. 7.

In yet another embodiment shown in FIGS. 7 and 8, a drain valve 210 mounts to a fuel tank wall or skin 216 of an aircraft. The drain valve includes a stem 212 and a flange 214, similar to the drain valve described above. In this embodiment, a retaining bracket or ring 230 at least substantially surrounds the flange 214 when the drain valve 210 mounts to the skin 216. The ring in the preferred embodiment is made of metal, preferably aluminum; however, the ring can be made of other suitable conductive material. The ring 230 includes openings 236 that align with openings 238 in the aircraft skin 216. Conventional fasteners 242 are received in the openings to attach the ring and the drain valve to the skin. In addition to or in lieu of using fasteners, the ring 230 can attach to the skin in other conventional manners. For example, the ring 230 can be threaded into the drain opening 218. In this embodiment, the diameter of the flange 214 can be slightly less than the diameter of the flange 14, described above. A means for directing an electric charge away from the drain valve 210 can be applied to the skin; such means referred to at numeral 228; however, this mounting arrangement can be used without a conductive coating underneath the flange 214 and/or ring 230. If desired, such means 228 can be applied to the underside of the flange 214. Such means in this embodiment includes the ALODINE® material described above. In this embodiment, the area of skin around the flange, the area that is covered by the conductive material, either has the paint and primer removed prior to applying the conductive material, or the paint and primer are never applied before applying the conductive material. The stem 212 of the drain valve 210 is received in a drain opening 218 defined in an aircraft skin 216. The ring 230 mounts to the aircraft skin 216 and substantially surrounds the flange 214 to trap the flange there between. In this embodiment, the mounting nut and the spacer need not be used. Also, the ring 230 can be in electrical communication with a conductive member, such as a thread or the like, that is in electrical communication with the skin 216, or the wire mesh embedded in a composite skin.

An important difference between the means for directing electrical charge as shown and described in the above embodiments relative to the conventional structure is the elimination of an electrical path beneath the flange to the drain opening and a creation of an electrical path to dissipate the electric charge into the aircraft skin and/or frame as soon as possible. For example, it is known from the prior art patents identified above to use a resilient seal ring, such as an O-ring, pressed between the valve flange and the skin. However, it is believed that the seal ring (perhaps because of minute, microscopic imperfections in the surface of the seal ring) allows an electrical path to exist whereby a lightning strike can undesirably bypass the O-ring. Consequently, it has been determined that the liquid sealant described above in selected ones of the embodiments is not a mere substitution of one type of seal for another. Rather, a substantiated difference in performance is achieved by focusing on directing an electrical charge away from the drain valve.

While the method herein described, and the tools for carrying this method into effect, constitute preferred embodiments of this invention, it is to be understood that the invention is not limited to this precise method and tools. For example, a method of mounting a drain valve has been described in particularity; however, the method can be used with mounting other components to the skin of an aircraft, including gas caps and other external fuel components and instrumentation, as well as antennae and other components that are to be lightning safe. Changes may be made without departing from the scope of the invention, which is defined in the appended claims.

The invention claimed is:

1. A method of mounting a drain valve in a drain opening in an aircraft skin, the method comprising:
   applying a conductive coating to the aircraft skin adjacent the drain opening;
   inserting a drain valve stem of the drain valve into the drain opening; and
   securing the drain valve to the aircraft skin such that the conductive coating extends radially beyond an outer radial dimension of a drain valve flange of the drain valve.

2. The method of claim 1, further comprising applying a dielectric sealant to at least one of the aircraft skin and the drain valve flange of the drain valve.

3. The method of claim 1, further comprising attaching a conductive retaining bracket to the drain valve flange and the aircraft skin such that the drain valve flange is sandwiched between the conductive retaining bracket and the aircraft skin.

4. The method of claim 1, wherein the step of applying a conductive coating further comprises applying the conductive coating to an outer surface of the aircraft skin.

5. The method of claim 2, wherein the step of applying a dielectric sealant comprises applying the dielectric sealant at a location such that it is interposed between the aircraft skin and the drain valve flange.

6. A kit for installing at least one drain valve for a fuel tank in for an aircraft, the kit comprising:
   a drain valve including a stem and a flange, wherein the flange is adapted to rest against a surface of the skin of an associated aircraft; and
   a chemical conversion coating adapted to be applied to the skin for directing electric charge from a lightning strike away from the drain valve; and
   a dielectric material adapted to be applied to at least one of the flange and the skin.

7. The kit of claim 6, wherein the dielectric material comprises a synthetic rubber sealant.

8. A method of mounting a drain valve in a drain valve opening in an aircraft skin, the method comprising:
   applying a conductive coating material to the aircraft skin;
   mounting the drain valve in a drain valve opening in the aircraft skin such that the conductive coating extends beyond a periphery of the drain valve.

9. The method of claim 8, wherein the step of applying a conductive coating comprises applying the coating circumferentially continuously around the drain valve opening.

10. The method of claim 8, further comprising applying a nonconductive sealant to at least one of the drain valve and the aircraft skin.

11. The method of claim 10 wherein the step of applying a nonconductive sealant further comprises applying the nonconductive sealant such that when the drain valve is mounted in the drain valve opening the nonconductive sealant is interposed between a surface of the aircraft skin and a portion of the drain valve.

12. The method of claim 11, wherein the nonconductive sealant is interposed between an outer surface of the aircraft skin and a drain valve flange of the drain valve.

13. The method of claim 8, wherein the step of applying a conductive coating material further comprises applying the conductive coating material to an outer surface of the aircraft skin.

14. In combination, an aircraft skin and a drain valve assembly mounted to the aircraft skin, the drain valve assembly comprising:
   a drain valve including a stem and an integral flange; and
   a conductive retaining ring attached to the aircraft skin and sandwiching at least a portion of the flange to the aircraft skin.

15. An assembly comprising:
   an aircraft skin including a drain opening;
   a drain valve including a drain valve flange, a portion of the drain valve being received in the drain opening; and
   a conductive coating disposed on a surface of the aircraft skin adjacent the drain opening, the conductive coating extending beyond an outer radial dimension of the drain valve flange.

16. The assembly of claim 15, wherein the conductive coating comprises a chemical conversion coating.

17. The assembly of claim 15, wherein the drain valve flange is disposed adjacent an outer surface of aircraft skin.

18. The assembly of claim 15, further comprising a dielectric material disposed between the aircraft skin and the drain valve flange.

19. The assembly of claim 18, wherein the dielectric material is disposed between an outer surface of the aircraft skin and the drain valve flange.

20. The assembly of claim 15, wherein the conductive coating is disposed on an outer surface of the aircraft skin.

* * * * *